United States Patent [19]

Deschamps et al.

[11] Patent Number: 4,781,903
[45] Date of Patent: Nov. 1, 1988

[54] PROCESS FOR REMOVING SULFUR OXIDES FROM A GAS BY MEANS OF AN ABSORPTION MASS REGENERABLE BY REACTION WITH ELEMENTAL SULFUR

[75] Inventors: André Deschamps, Noisy le Roi; Sigismond Franckowiak, Rueil-Malmaison; Serge Leporq, Mantes la Ville, all of France

[73] Assignee: Institut Francais du Petro, Rueil-Malmaison, France

[21] Appl. No.: 906,480

[22] Filed: Sep. 12, 1986

[30] Foreign Application Priority Data

Sep. 13, 1985 [FR] France ................ 85 13728

[51] Int. Cl.⁴ ............ C01B 13/14; C01B 17/00; C01F 5/02; B01J 8/00
[52] U.S. Cl. ............................... 423/244; 423/638
[58] Field of Search .......... 423/242 R, 242 A, 244 R, 423/244 A, 541 R, 638, 543

[56] References Cited

U.S. PATENT DOCUMENTS

| | | | |
|---|---|---|---|
| 3,761,570 | 9/1973 | Lowicki et al. | 423/242 |
| 4,043,822 | 8/1977 | Kansay et al. | 423/543 |
| 4,153,535 | 5/1979 | Vasalos et al. | 423/244 |
| 4,323,544 | 4/1982 | Magder | 423/244 |
| 4,423,019 | 12/1983 | Butolacini et al. | 423/244 |

FOREIGN PATENT DOCUMENTS 764537 12/1958 United Kingdom ............... 423/638

*Primary Examiner*—Gregory A. Heller
*Attorney, Agent, or Firm*—Millen & White

[57] ABSTRACT

The invention relates to a process for removing sulfur oxides, particularly sulfur dioxide, contained in gases such as industrial fumes, characterized in that the gas is contacted with a solid absorbent containing magnesium oxide, in such conditions that sulfur oxides are fixed mainly as magnesium sulfate and then the used solid absorbent is contacted with a gas stream containing elemental sulfur in such conditions that magnesium oxide is regenerated with the production of an effluent of sulfur dioxide-containing gas.

12 Claims, No Drawings

PROCESS FOR REMOVING SULFUR OXIDES FROM A GAS BY MEANS OF AN ABSORPTION MASS REGENERABLE BY REACTION WITH ELEMENTAL SULFUR

The invention concerns a process for removing sulfur oxides, particularly sulfur dioxide, contained in such gases as industrial fumes, wherein the gas is contacted with a solid absorbent containing magnesium oxide, in such conditions that the sulfur oxides are mainly fixed as magnesium sulfate, and then the used solid absorbent is contacted with a gas stream containing element sulfur, in such conditions as to regenerate the magnesium oxide, while producing a sulfur dioxide-containing gas effluent.

According to a particular embodiment of the invention, the gas stream of high sulfur dioxide content discharged from the solid regeneration stage is fed to a Claus unit for being converted to sulfur by reaction with hydrogen sulfide and a portion of the produced sulfur is recycled to the solid regeneration stage.

BACKGROUND OF THE INVENTION

The removal of sulfur oxides and of nitrogen oxides contained in industrial effluents is of increasing importance, particularily in view of acid rain phenomena which are highly detrimental to the environment in industrialized countries and countries proximate thereto.

The main sources of these polluting emissions are the fumes from thermal power plants, industrial furnaces and heaters as well as the effluents from various chemical and refining plants: units for manufacturing sulfuric acid, for calcination of ores, Claus units, catalytic cracking units . . . . Many processes for purifying these effluents have already been proposed and some are industrially used but they all have some disadvantages.

Thus the processes of the wet type, using aqueous solutions or suspensions of carbonates, hydroxides or sulfites of alkali or alkaline-earth metals or of ammonium, have the disadvantage of requiring the cooling of the fumes and their subsequent re-heating before discharge to the atmosphere. Moreover, the formed products—sulfites and sulfates—raise problems of waste disposal for processes with external discharge, or of high cost of treatment for processes with regeneration.

The processes of the dry type, using limestone or dolomite, have also the problem of by-products discharge and generally suffer from insufficient performances.

Some processes of the dry type using regenerable solid absorbents, have also been proposed. Most of them, as the process with alkalinized alumina (U.S. Pat. No. 2,992,884) or the process with copper oxide (U.S. Pat. No. 3,778,501), require the use of such reducing gases as hydroge or a mixture of hydrogen with carbon monoxide to regenerate the absorbent.

These techniques have the disadvantage of consuming expensive reducing gases, which strongly affects their economy.

Other processes, as those disclosed in U.S. Pat. Nos. 3,755,535, 4,283,380, 4,426,365 and Canadian patent No. 1 1 36 384, use, for the solid regeneration, hydrogen sulfide which is an inexpensive reducing agent. This technique has the disadvantage of producing, as gas effluent from the regeneration stage, a relatively corrosive complex mixture containing hydrogen sulfide, sulfur dioxide, sulfur vapor and steam, wherefrom sulfur recovery is relatively difficult. For this recovery it is generally proposed to supply this mixture to a Claus unit, but its variable composition and its corrosivity make the operation very difficult.

SUMMARY OF THE INVENTION

The present invention copes with these disadvantages by providing an improved and economical process for removing sulfur oxides from fumes by means of regenerable masses, by reaction with sulfur vapor.

One of the advantages of the process is to provide an efficient method for regenerating sulfated absorbents with the use of an inexpensive reducing agent consisting of elemental sulfur.

A second advantage results from the fact that the only gaseous product formed in this reduction of sulfated absorbents is sulfur dioxide. The gas effluent from the regeneration stage is thus free of hydrogen sulfide and of steam and is accordingly not corrosive. Moreover, in addition to sulfur dioxide, it contains only elemental sulfur, which is easily condensable, and which accordingly facilitates sulfur dioxide recovery.

According to a preferred embodiment, the invention concerns a process for removing sulfur oxides, particularly sulfur dioxide, contained in industrial gases also containing oxygen, characterized by the steps of:

(a) contacting the gas at a temperature of 350°–750° C. with a solid absorbent containing magnesium oxide, so as to fix sulfur oxides, mainly as magnesium sulfate, (b) separating the sulfated solid absorbent from the gas and regenerating it by contact with elemental sulfur at a temperature of 350°–750° C., and (c) separating the regenerated solid absorbent from the regenerating gases and re-using it for sulfur oxide absorption.

The solid absorbents used according to the invention contain magnesium oxide as compound chemically active with respect to sulfur oxides. Although this oxide could be used in pure state, for example by injecting it, as powder, in the gas stream, it is preferably associated with a binder and/or an inorganic textural promoter, whereby the absorbent can be shaped as balls, extrudates or pellets, particularly adapted to the use of the solid absorbent in a fixed bed, moving bed or fluidized bed.

These absorbents can be prepared by methods known for the preparation of catalysts, particularly by agglomeration of magnesium oxide powder with mineral binders such as kaolin, montmorillonite, attapulgite or refractory cement; by hydroxide or carbonate precipitation in the presence of a textural promoter as alumina and/or silica; or by impregnation of a porous carrier with a solution of salt decomposable to oxide by heating. This last method is generally preferred.

The alumina carriers are refractory mineral oxides as alumina, silica, silicas-aluminas, zirconium and titanium oxides, mixed oxides of the spinel type, particularly of magnesium and aluminum. They generally have a specific surface from 10 to 300 $m^2/g$, preferably from 20 to 150 $m^2/g$.

According to a preferred embodiment, the carrier is impregnated with an aqueous solution of a precursor salt of magnesium oxide, such for example as a nitrate, acetate, citrate, dried in a stove at 100°–150° C. and then roasted at 400°–700° C. to decompose the salt to the oxide.

The magnesium oxide content of the absorbent may vary within a wide range, for example 1–50% by weight. It is preferably from 2 to 30% by weight.

A preferred absorbent consists essentially of alumina and magnesium oxide, the magnesium oxide content being from 1 to 50% by weight, preferably from 2 to 30%.

The absorbent may advantageously further contain compounds of metals known to improve the efficiency of sulfur dioxide collection by metal oxides. These metals are generally known by their capacity to promote the oxidation of $SO_2$ to $SO_3$, such as most of the transition metals, particularly vanadium, iron, group VIII noble metals, platinum, palladium, iridium, rhodium, osmium, ruthenium, and rare earth metals such as lanthanum, cerium. The $SO_2$ oxidation promoter content of the absorbent may vary widely, for example from 0 to 2% by weight of metal with respect to the absorbent. With platinum and/or palladium, the content will preferably range from 0.001% to 1% by weight of the absorbent.

The step of sulfur oxide absorption is performed by contacting the sulfur oxide-containing fumes and oxygen with the absorbent at a temperature from 350° to 750° C., preferably from 400° to 650° C. The oxygen content of the fume is generally from 1 to 10% by volume, preferably from 2 to 6% by volume and at least equal to 1 mole of oxygen per mole of sulfur dioxide. The space velocity (volume of treated gas, measured under normal temperature and pressure conditions, per volume of absorbent and per hour) is generally from 200 to 5000, preferably from 500 to 3000.

When the absorbent is charged with sulfur oxides in a proportion varying, for example, from 0.1 to 1 mole of sulfur per mole of magnesium oxide, it is subjected to the regeneration step by contact with element sulfur at a temperature from 350° to 750° C., for a sufficient time to restore the major part of its sulfur oxide initial absorption capacity. This time obviously depends on the temperature and on the hourly sulfur supply. Generally it ranges from 0.2 to 15 hours.

Although the regeneration step could be performed in the presence of liquid sulfur, it is generally preferred to use sulfur vapor, either pure or diluted in a nitrogen and/or sulfur dioxide stream. The sulfur partial pressure in the gas is then usefully at least 0.005 bar. The operating pressure may vary within a wide range, for example of 1 to 20 bars, but it is generally preferred to operate at atmospheric pressure.

The absorbent, as well in the sulfur oxide collection step as in the regeneration step, may be used in a fixed bed, moving bed or fluidized bed.

The gas effluent from the regeneration step has an increased sulfur dioxide content as compared with the input gas. It also generally contains an excess of elemental sulfur. This gas mixture may be treated in different ways according to the desired up-grading of the produced sulfur dioxide. For example, it may be cooled to condense sulfur and then to recover pure sulfur dioxide. It may also be supplied as such to a proximate Claus unit so as to convert sulfur dioxide to elemental sulfur by reaction with hydrogen sulfide. A portion of the formed sulfur is then re-used in the absorbent regeneration step. The produced sulfur dioxide may also be converted to sulfuric acid.

The regenerated solid absorbent is recycled to the sulfur oxide collection step, optionally after stripping with an inert gas such as nitrogen to remove the trace of residual sulfur absorbed in the pores.

The process according to the invention is applicable to the treatment of all the gases or fumes containing sulfur oxides and hydrogen, for example the fumes from thermal power plants, industrial furnaces and boilers, units for manufacturing sulfuric acid, for calcining ores, Claus units, units for catalytic cracking catalysts regeneration.

EXAMPLES

The following examples are given to illustrate the invention but must not be considered as limiting the scope thereof.

EXAMPLE 1

An absorbent A is prepared by impregnating an activated alumina of 130 m$^2$/g specific surface, available as balls of 2–4 mm diameter, with 100 cm$^3$ of a solution containing 70 g of magnesium nitrate Mg $(NO_3)_2$, $6H_2O$. The impregnated solid is dried in a stove at 120° C. for 6 hours, 200° C. for 12 hours and then roasted at 600° C. for 2 hours.

The obtained absorbent A contains about 10% by weight of magnesium oxide.

EXAMPLE 2

An absorbent B is prepared by repeating the preparation of example 1 and then further impregnating the solid with 100 cm$^3$ of a chloroplatinic acid solution containing 55 mg/l of platinum. The absorbent obtained after drying and roasting contains about 10% by weight of magnesium oxide and 50 ppm by weight of platinum.

EXAMPLE 3

An absorbent C is prepared by repeating the preparation of example 1 and then further impregnating the solid with 100 cm$^3$ of an aqueous solution of palladium chloride containing 55 mg/l of palladium. The absorbent C obtained after drying and roasting contains about 10% by weight of magnesium oxide and 50 ppm by weight of palladium.

EXAMPLE 4

100 cm$^3$ (about 55.5g) of absorbent are placed in a quartz tube of 3 cm inner diameter and 50 cm length, heated to a regulated temperature by a tubular furnace. The top of the reactor is fed with 100 Nl/h of a reconstituted fume having the following composition:

|  | $N_2$ | $CO_2$ | $H_2O$ | $O_2$ | $SO_2$ |
| --- | --- | --- | --- | --- | --- |
| Volume % | 75.75 | 10 | 10 | 4 | 0.25 |

The reactor gas effluent is continuously analyzed to determine its sulfur oxides ($SO_2+SO_3$) content. When the loss of sulfur oxides in the output gas reaches 200 ppm by volume, the fume supply is discontinued and the absorbent regenerated by introducing at the top of the reactor a nitrogen stream (about 30 Nl/h) charged with sulfur vapor by bubbling through liquid sulfur maintained at about 250° C. 4.8 g/hour of sulfur are thus introduced in the reactor.

After about 6 hours, the flow of gas charged with sulfur is discontinued, the reactor is purged with nitrogen for 5 minutes and sulfur dioxide—containing fume is again supplied onto the regenerated absorbent.

Twenty cycles of collection-regeneration with absorbents A, B and C of examples 1, 2 and 3 are thus performed.

The following table gives the results, expressed as the time during which the sulfur oxide loss remained lower than 200 ppm by volume for each test.

This table shows that these sulfur oxides absorbents, mainly consisting of magnesium oxide, are efficiently regenerated by reaction with sulfur vapor.

TABLE

| Absorbent | A | B | C |
|---|---|---|---|
| Temperature of the collection step °C. | 600 | 500 | 500 |
| Temperature of the regeneration step °C. | 600 | 570 | 570 |
| Time in hours of the collection step with a loss of SOx < 200 ppm vol | | | |
| 1st collection | 5.5 | 11.7 | 11.2 |
| 2nd collection | 3.9 | 10.2 | 10.0 |
| 3rd collection | 3.8 | 10 | 9.8 |
| 10th collection | 3.7 | 9.9 | 9.6 |
| 20th collection | 3.7 | 9.8 | 9.5 |

What is claimed as this invention is:

1. A process for removing sulfur dioxide from a gas containing the same, consisting essentially of a first step of contacting the gas with a solid absorbent containing magnesium oxide, in the presence of oxygen and a second step conducted at 350°–750° C. of contacting the absorbent containing magnesium sulfate with a reducing gas consisting essentially of sulfur vapor, so as to regenerate magnesium oxide in the absorbent.

2. A process according to claim 1, wherein the solid absorbent contains 1–50% by weight of magnesium oxide.

3. A process according to claim 1, wherein the absorbent essentially consists of alumina and magnesium oxide, the magnesium oxide content being from 1 to 50% by weight.

4. A process according to claim 1, wherein the absorbent further contains at least one metal of the group consisting of vanadium, iron, group VIII noble metals and rare earths.

5. A process according to claim 4, wherein the metal is platinum or, palladium or both used in a proportion from 0.001 to 0.1% by weight.

6. A process according to claim 1, wherein the gas contains 1 to 10% by volume of oxygen, in a proportion of at least one mole per mole of sulfur dioxide.

7. A process according to claim 1, wherein sulfur vapor is used at a partial pressure of at least 0.005 bar and in a proportion of at least one gram-atom of sulfur per 2 gram-molecules of magnesium sulfate present in the absorbent at the beginning of the second step.

8. A process according to claim 1, wherein the first step is continued up to the fixation of 0.1 to 1 mole of sulfur oxides per mole of magnesium oxide.

9. A process according to claim 1, wherein the absorbent, after the second step, is subjected to stripping with an inert gas, to remove absorbed residual sulfur and then recycled to the first step and re-used to remove sulfur dioxide according to the first step process.

10. A process according to claim 1, wherein the regeneration step is conducted at 350° to less than 750° C.

11. A process according to claim 1, wherein the first step is conducted at 350°–750° C.

12. A process according to claim 1, wherein the reducing gas is nitrogen saturated with sulfur vapor.

* * * * *

UNITED STATES PATENT AND TRADEMARK OFFICE
CERTIFICATE OF CORRECTION

PATENT NO. : 4,781,903
DATED : November 1, 1988
INVENTOR(S) : Deschamps et al

It is certified that error appears in the above-identified patent and that said Letters Patent is hereby corrected as shown below:

Title Page, Assignee:

Should Read: --Institut Francais du Petrole--

Signed and Sealed this

Twenty-eighth Day of March, 1989

Attest:

DONALD J. QUIGG

*Attesting Officer*   *Commissioner of Patents and Trademarks*